United States Patent [19]

Kishimoto

[11] Patent Number: 4,513,217

[45] Date of Patent: Apr. 23, 1985

[54] ROTARY ARMATURE WITH COOLING OF COMMUTATOR

[75] Inventor: Syoji Kishimoto, Kobe, Japan

[73] Assignee: Mitsubishi Denki Kabushiki Kaisha, Tokyo, Japan

[21] Appl. No.: 559,434

[22] Filed: Dec. 8, 1983

[30] Foreign Application Priority Data

Dec. 15, 1982 [JP] Japan .............................. 57-191734

[51] Int. Cl.[3] .............................................. H02K 9/28

[52] U.S. Cl. ...................................... 310/227; 310/61

[58] Field of Search ....................... 310/52, 53, 58–65, 310/227, 233, 235, 236

[56] References Cited

U.S. PATENT DOCUMENTS

| | | | |
|---|---|---|---|
| 923,673 | 6/1909 | Lord | 310/227 X |
| 1,684,168 | 9/1928 | Bethel et al. | 310/227 X |
| 2,315,177 | 3/1943 | Zadnik | 310/227 |

FOREIGN PATENT DOCUMENTS

| | | | |
|---|---|---|---|
| 586895 | 10/1933 | Fed. Rep. of Germany | 310/227 |
| 875073 | 7/1949 | Fed. Rep. of Germany | 310/227 |

OTHER PUBLICATIONS

Shinko Electric Co., Ltd., Catalogue No. 92 (vol. 27, No. 1, 1982, p. 33) New Type DC Motors, GN and G Series.

Yasukawa Electric Mfg. Co., Ltd., Catalogue vol. 46, Serial No. 175 (No. 2 1982, p. 98) New Series DC Motors.

*Primary Examiner*—Mark O. Budd

*Attorney, Agent, or Firm*—Wenderoth, Lind & Ponack

[57] ABSTRACT

A commutator includes an annular end portion with a reduced diameter on each of its axially opposite sides formed by cutting away axially opposite end portions of a plurality of commutator segments included in the commutator into opposite steps, a shrink ring fitted onto the reduced diameter annular end portion remote from an armature clamp, a flanged shrink ring fitted onto the reduced diameter end portion near to the armature clamp and fitted onto a reduced diameter annular portion of an outer clamping ring of an L-shaped cross-section and supporting an armature coil, the shrink rings being formed of an insulating material.

7 Claims, 2 Drawing Figures

ROTARY ARMATURE WITH COOLING OF COMMUTATOR

BACKGROUND OF THE INVENTION

This invention relates to improvements in a rotary armature having a shrink ring type commutator.

A conventional rotary armature of the type referred to has comprised an armature core with an armature coil fitted onto a rotary shaft, an armature clamp shrink-fitted onto the rotary shaft to keep the armature core in place on the rotary shaft, and a shrink ring type commutator firmly fitted onto the rotary shaft with a prearranged space between the same and the armature clamp. The shrink ring type commutator has included a plurality of commutator segments and alternating mica pieces disposed around the rotary shaft to form an annulus coaxial with the latter, a pair of insulating shrink rings coaxial with the rotary shaft and fitted in axially aligned opposite relationship into the annulus through axially opposite surfaces thereof, and a commutator spider shrink-fitted onto the rotary shaft and onto which the shrink ring located on the side toward the armature core is fixed, and also onto which is fitted a commutator clamp onto which the other shrink ring is fitted. A plurality of ventilating holes have extended through the commutator spider, the armature core and the clamp and connected to each other to form an axial ventilation system.

In conventional rotary armatures such as described above the commutator has been fitted onto the rotary shaft through the commutator clamp and spider while, in order to support the armature core and coil, the armature clamp has been fitted onto the rotary shaft separately from the commutator. Also, in order to more and more precisely design and construct the commutator spider, clamp segments and the associated components with greater precision as required lately, they have been subjected to severe limitations as to dimensions thereof. This has resulted in an insufficient area of the ventilation passages required for cooling.

Accordingly it is an object of the present invention to provide a rotary armature including a new and improved shrink ring type commutator providing a sufficient area of the ventilation passages required for cooling in order to improve the cooling effect.

SUMMARY OF THE INVENTION

The present invention provides a rotary armature comprising a shrink ring type commutator, a rotary shaft, an armature core with an armature coil fitted onto the rotary shaft, an armature clamp fitted onto the rotary shaft to clamp the armature core, the armature clamp being part of a unitary structure with the shrink ring type commutator to support the latter, and a large annular ventilating space the inner peripheral surface of the shrink ring type commutator and the outer peripheral surface of the rotary shaft.

In a preferred embodiment of the present invention, the shrink ring type commutator includes an annular end portion with a reduced diameter on an each of the axially opposite ends thereof formed by cutting away axially opposite end portions of a plurality of the commutator segments included in the shrink ring type commutator into opposite steps, a shrink ring fitted onto the annular end portion with the reduced diameter remote from the armature clamp, and a flanged shrink ring fitted onto the end portion with the reduced diameter near to the armature clamper and also fitted onto an outer ring of the armature clamp having an L-shaped cross-section with the armature coil supported by the flanged shrink ring.

BRIEF DESCRIPTION OF THE DRAWING

The present invention will become more readily apparent from the following detailed description taken in conjunction with the accompanying drawing in which.

DESCRIPTION OF THE PREFERRED EMBODIMENT

Figure 1:
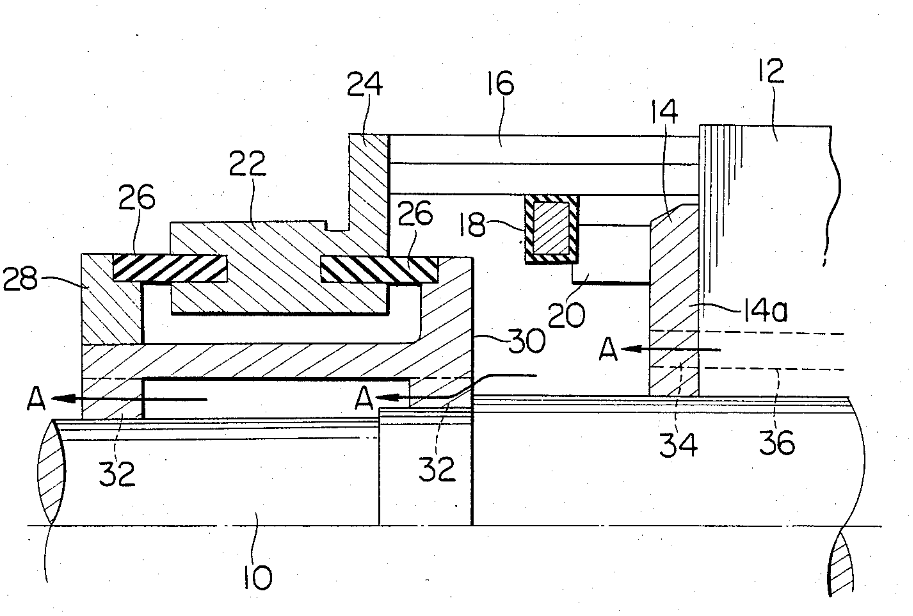
FIG. 1 is a fragmental longitudinal sectional view of one half of a conventional shrink ring type commutator assembly with parts illustrated in elevation.

For a better understanding of the nature of the present invention, a description will be given of a conventional shrink ring type commutator as shown in FIG. 1 of the drawing. The arrangement illustrated comprises a rotary shaft 10, an annular armature core 12 shrink-fitted onto the rotary shaft 10, and an armature clamp 14 also shrink-fitted onto the rotary shaft 10 abutting the end surface, the lefthand surface as viewed in FIG. 1, of the armature core 12 thereby to maintain the armature core 12 in place on the rotary shaft, and an armature coil 16 extending from slots on the armature core 12 coaxially with the rotary shaft 10 and supported by the armature clamp 14. More specifically, the inner peripheral surface of the armature coil 16 is supported at the middle portion by an insulated metallic holder 18 in the form of a ring connected to the armature clamp 14 through a plurality of connecting rods 20 (only one of which is illustrated) disposed at predetermined equal angular intervals.

The arrangement further comprises a plurality of commutator segments 22 and alternating mica pieces (not shown) disposed around the rotary shaft 10 and together forming an annulus coaxial with and spaced radially outwardly from the latter. FIG. 1 shows one of the commutator segments 18 only for purposes of illustration. Each of the commutator segments 18 is provided on that side thereof facing toward the armature clamp 14 with a riser 24 having an end surface substantially flush with the outer peripheral surface of the armature coil 16 and electrically connected to the armature coil 16 by brazing. A pair of shrink rings 26 of an electrically insulating material are rigidly fitted in opposite spaced relationship into the annulus as described above and are axially aligned with each other and coaxial with the rotary shaft 10 with a pedetermined annular spacing formed therebetween. To this end, each of the shrink rings 26 has one half firmly fitted into an associated annular groove disposed in the corresponding and face of the annulus to ensure that the commutator segments and alternating mica pieces are maintained in the annular arrangement.

The exposed end portion of that shrink ring 26 remote from the armature core 12 is rigidly fitted onto an annular step disposed on the radially outward end of an annular commutator clamp 28 and facing the annulus of the commutator segments 22 while the other shrink ring 26 located on the other side of the armature core 12 is similarly fitted onto a commutator spider 30. More specifically, the commutator spider 30 includes a pair of larger and smaller discs perpendicular to the rotary shaft 10 and connected to each other by a hollow cylindrical member coaxial with the rotary shaft 10 to form an annular space therebetween. The larger disc is provided on that end surface thereof facing the commutator segment annulus with an annular step onto which the other shrink ring 26 is rigidly fitted while the shorter disc has a radially outward peripheral surface onto which the commutator clamp 28 is rigidly fitted. The two discs of the commutator spider 30 are shrink-fitted onto the rotary shaft 10 with the larger disc adjoining a shoulder disposed on the rotary shaft 10.

Commutator is a general term for the commutator segments 22, the shrink rings 26, the commutator clamp 28 and the commutator spider 30.

Further a plurality of ventilating holes 32 are provided at predetermined equal angular intervals through each of the radial inward end portions of the smaller and larger discs of the commutator spider 30 on a cylinder coaxial with the rotary shaft 10.

Also a plurality of ventilating holes 34 extend at predetermined equal angular intervals through the armature clamper 14 coaxial with the rotary shaft 10 and axially aligned with ventilating holes 36 similarly disposed on the armature core 12.

Cooling air first passes through the ventilating holes 36 in the armature core 12 and then the ventilating holes 34 in the armature clamper 14 shown by the short lines A to cool them. Thereafter the air passes through the ventilating holes 32 in the commutator spider 30 to cool the commutator. Alternatively cooling air may pass through the arrangement of FIG. 1 in a direction reverse to that described above in accordance with the type of the particular electric motor.

In conventional commutators such as shown in FIG. 1, the commutator has been fitted onto the rotary shaft 10 through the commutator clamp 28 and the commutator spider 30. Also, in order to support the armature core and coil 12 and 16 respectively, the armature clamp 14 has been fitted onto the rotary shaft 10 separately from the commutator. Also in order to design and construct the commutator spider, clamp and segments and the associated components with greater precision as required lately, they have been subjected to restrictions as to dimensions thereof. This has resulted in the insufficient area of the ventilation passages required for cooling.

The present invention seeks to provide sufficient area of the ventilation passages to improve the cooling effect thereof.

Figure 2:
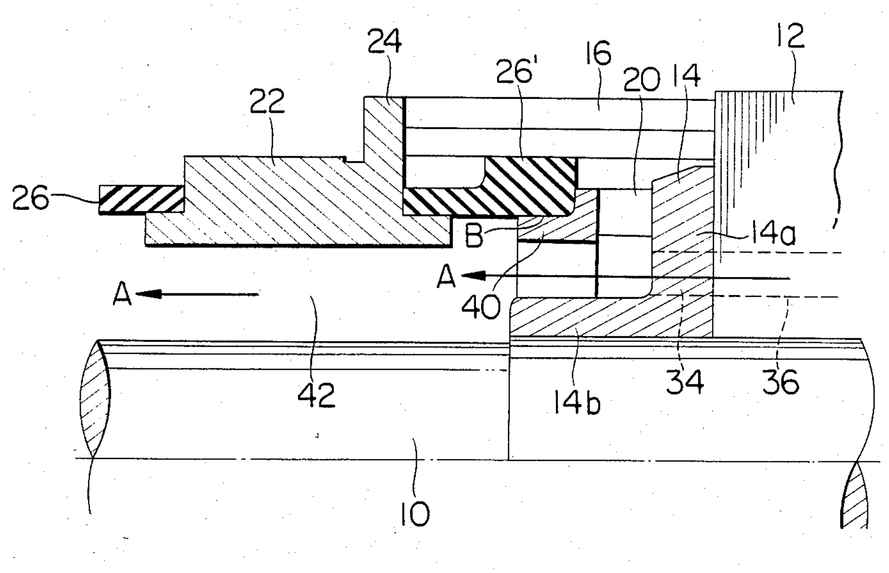
FIG. 2 is a fragmental longitudinal sectional view of one half of one embodiment according to the rotary armature of the present invention with parts illustrated in elevation.

In FIG. 2 wherein like reference numerals designate the components identical to or corresponding to those shown in FIG. 1, there is illustrated one embodiment of the rotary armature of the present invention. In the arrangement illustrated the armature clamper 14 includes a disc 14*a* and a central extension 14*b* running perpendicularly to the disc 14*a* and having a central opening extending through the central extension 14*b* and the disc 14*a* and large enough to accommodate the rotary shaft 10 to permit shrink fitting. The armature clamp 14 includes further an outer clamping ring 40 having an L-shaped cross-section coaxially disposed around the central extension 14*b* and spaced radially thereon and having the larger end surface connected to the disc 14*a* by a plurality of connecting rods 20 disposed at predetermined equal angular intervals on a cylinder and coaxially with the central extension 14*b* therebetween. Thus the outer ring 40 defines an annular space between the inner peripheral surface thereof and the outer peripheral surface of the central extension 14*b*, and it further has an annular surface with a reduced diameter spaced outwardly from the longitudinal axis of the central extension 14*b* by a predetermined distance and terminating at an annular end surface somewhat nearer to the disc 14*a* than that of the corresponding end surface of the central extension 14*b*.

The armature clamper 14 is shrink-fitted onto the rotary shaft 10 with the disc 14*a* abutting the armature core 12 as in the arrangement of FIG. 1. At that time the disc 14*a* terminates short of the armature coil 16 as in the arrangement of FIG. 1 and the central extension 14*b* terminates at a shoulder disposed on the rotary shaft 10.

The disc 14*a* of the armature clamp 14 has preliminarily extending therethrough a plurality of ventilating holes 34, in the same manner as described above in conjunction with FIG. 1, axially aligned with the ventilating holes 36 similarly extending through the armature core 12. It is noted in FIG. 2 that the aligned ventilating holes 34 and 36 face the annular space formed between the clamping outer ring 40 and the central extension 14*b* of the armature clamp 14.

On the other hand, a plurality of commutator segments 22 and alternate mica pieces (not shown) are assembled into an annulus constituting a commutator segment assembly as in the arrangement of FIG. 1. While FIG. 2 shows one of the commutator segments 22 only for purposes of illustration each of them includes a pair of axially opposite end portions cut away into rectangular steps with a riser 24 forming the rising surface of one of the steps, in this case, the righthand step. In FIG. 2 it is noted that the commutator clamp and spider as shown in FIG. 1 are omitted.

After the formation of the commutator segment assembly as described above, only the commutator segments and mica pieces need be made round. A band is fitted onto the outer peripheral surface of the commutator segment assembly to apply a predetermined surface pressure to the latter. With the segment assembly in that condition a shrink ring is rigidly fitted onto an annular end portion with a reduced diameter formed in each of the rectangular steps on the corresponding axial ends of the commutator segment assembly and then the band is removed from the assembly. Then the inner peripheral surface of the commutator segment assembly is coated with an insulating material. At that time the commutator is completed.

In the example illustrated, the shrink rings 26 and 26' are formed of an electrically insulating material and one of them, in this case, the lefthand shrink ring 26 as viewed in FIG. 2 is in the form of a simple ring while the other or righthand shrink ring 26' near the armature clamp 14 is in the form of a flanged ring. That is, the shrink ring 26' includes a flange extending radially outwardly from that end thereof near the armature clamp 14 and terminating in a cylindrical end surface.

Then the commutator thus formed is firmly mounted around the rotary shaft simply by rigidly fitting it onto the reduced diameter cylindrical surface of the outer clamping ring 40 designated by the reference character B. Thus the commutator is connected to the armature clamp 14 to form a unitary structure coaxially disposed around the rotary shaft 10 and leaving a large annular space 42 between the inner peripheral surface thereof and the outer peripheral surface of the rotary shaft 10. Accordingly the annular space 42 provides a large area for cooling the commutator with air passing through the ventilating holes 34 and 36 in the armature clamp and core 14 and 12 respectively.

The riser 24 is preliminarily sized and positioned on the commutator segment 22 so that, when the commutator is connected to the armature clamp 14, it has the end surface substantially flush with the outer surface of an associated portion of the commutator coil 16 and a lateral surface abutting against the end of the associated portion of the coil 16. At the same time the flanged shrink ring 26' is preliminarily sized and shaped so that it supports the commutator by overhanging the latter and simultaneously supports the armature coil 16.

From the foregoing it is noted that, according to the present invention, the conventionally used commutator spider and clamp can be omitted and the commutator segment assembly is not provided with a pair of annular grooves into which the shrink rings are fitted. Thus the commutator has a reduced radial dimension yet it permits a sufficient ventilating space to be provided between the same and the rotary shaft to improve the cooling effect. Further the number of the components and amount of materials used is reduced resulting in a decrease in the number of the forming steps.

While the present invention has been illustrated are described in conjunction with a single preferred embodiment thereof it is to be understood that numerous changes and modifications may be resorted to without departing from the spirit and scope of the present invention. For example, each of the insulating shrink rings may be replaced by another ring made of a rigid metallic material such as iron with the surface compltely covered with an electrically insulating material. Also one of the shrink rings may extend axially so as to cover the inner peripheral surface of the commutator to insulate the latter. Furthermore the armature clamp may be formed of an insulating material to serve also as the shrink ring located on the side of the armature core.

What is claimed is:

1. A rotary armature comprising:

a rotary shaft;

an armature core having an armature coil fitted onto said rotary shaft;

an armature clamp fitted onto the rotary shaft and abutting said armature core for holding said armature core in position on said rotary shaft;

a shrink ring type commutator having a plurality of commutator segments assembled into an annulus and having shrink rings at least the outsides of which are electrically insulating material on opposite ends thereof holding said segments in said annulus, the shrink ring on the end toward said armature core being rigidly connected to said armature clamp to leave a large annular ventilating space between the inner peripheral surface of said shrink ring type commutator and an outer peripheral surface of said rotary shaft, said space being unobstructed at the end remote from said armature clamp.

2. A rotary armature as claimed in claim 1 wherein said shrink ring type commutator has an annular end portion with a reduced diameter on each of the axially opposite ends thereof formed by cutting away axially opposite end portions of said commutator segments into opposite steps, and said shrink rings are fitted onto said annular end portions with the reduced diameter, said shrink ring at the end toward said armature being a flanged shrink ring mounted on said armature clamp.

3. A rotary armature as claimed in claim 2 wherein said armature coil projects past the end of said armature, and the flanged part of said flanged shrink ring supports said armature coil.

4. A rotary armature as claimed in claim 2 wherein said armature clamp includes an outer clamping ring having an L-shaped cross-section and the flanged part of said flanged shrink ring is fitted into the reduced diameter part of said outer clamping ring, said outer clamping ring being rigidly mounted on said armature clamp.

5. A rotary armature as claimed in claim 4 wherein said armature coil projects past the end of said armature, and the flanged part of said flanged shrink ring supports said armature coil.

6. A rotary armature as claimed in claim 1 wherein each of said shrink rings is made of an electrically insulating material.

7. A rotary armature as claimed in claim 1 wherein each of said shrink rings is a rigid metallic material and has the surface completely covered with an electrically insulating material.

* * * * *